(12) United States Patent
Eckenroth et al.

(10) Patent No.: US 9,701,217 B2
(45) Date of Patent: Jul. 11, 2017

(54) LONGITUDINAL ADJUSTING DEVICE FOR A VEHICLE SEAT, COMPRISING A SEPARABLE UPPER AND LOWER RAIL

(75) Inventors: Dirk Eckenroth, Bergisch Gladbach (DE); Holger Röbkes, Solingen (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 100 days.

(21) Appl. No.: 13/818,516

(22) PCT Filed: Aug. 23, 2011

(86) PCT No.: PCT/EP2011/064490
§ 371 (c)(1),
(2), (4) Date: Apr. 19, 2013

(87) PCT Pub. No.: WO2012/025539
PCT Pub. Date: Mar. 1, 2012

(65) Prior Publication Data
US 2013/0206953 A1    Aug. 15, 2013

(30) Foreign Application Priority Data

Aug. 23, 2010  (DE) .................. 10 2010 035 157
Dec. 21, 2010  (DE) .................. 10 2010 063 615

(51) Int. Cl.
*B60N 2/07*     (2006.01)
*B60N 2/08*     (2006.01)
*B60N 2/015*    (2006.01)

(52) U.S. Cl.
CPC ............. *B60N 2/08* (2013.01); *B60N 2/0155* (2013.01); *B60N 2/01525* (2013.01);
(Continued)

(58) Field of Classification Search
USPC ....... 248/419, 421, 423, 424, 425, 429, 430, 248/500, 503.1; 96/65.13; 296/65.13
See application file for complete search history.

(56) References Cited

U.S. PATENT DOCUMENTS 2,277,947 A  *  3/1942  Bailey .................... B60N 2/071
                                                248/429
4,496,271 A  *  1/1985  Spinosa ................... B64C 1/20
                                                248/503.1
(Continued)

FOREIGN PATENT DOCUMENTS

CN         1537746 A       10/2004
DE      200 19 891 U1       5/2001
(Continued)

OTHER PUBLICATIONS

Office Action received in Japanese Application No. 2013-524462 dated Mar. 18, 2014. (with translation).
(Continued)

*Primary Examiner* — Muhammad Ijaz
(74) *Attorney, Agent, or Firm* — Foley & Lardner LLP

(57) ABSTRACT

A longitudinal adjusting device for a vehicle seat, includes a lower rail and an upper rail, wherein the upper rail is arranged longitudinally displaceably in the lower rail. The upper rail is engaged with the lower rail. A retaining and guiding element is designed, integrally formed or arranged on an upper edge of the lower rail. The element holds the upper rail on the lower rail in the operating position. At least two locking elements are arranged on and/or integrated in the upper rail and after same are unlocked. The upper rail and a vehicle seat attached thereto in a predefined position can be separated from the lower rail.

18 Claims, 3 Drawing Sheets

(52) U.S. Cl.
CPC ..... *B60N 2/01575* (2013.01); *B60N 2/01591* (2013.01); *B60N 2/07* (2013.01); *B60N 2/072* (2013.01); *B60N 2/0705* (2013.01); *B60N 2/0818* (2013.01); *B60N 2/0868* (2013.01)

(56) References Cited

U.S. PATENT DOCUMENTS

| | | | | |
|---|---|---|---|---|
| 4,511,187 | A * | 4/1985 | Rees | B60N 2/0705 248/430 |
| 4,781,354 | A * | 11/1988 | Nihei | B60N 2/123 248/424 |
| 4,881,827 | A * | 11/1989 | Borlinghaus | B60N 2/06 248/430 |
| 4,892,282 | A * | 1/1990 | Suzuki | B60N 2/0715 248/430 |
| 4,948,189 | A * | 8/1990 | Terada | B60N 2/0705 248/429 |
| 5,167,393 | A * | 12/1992 | Hayakawa | B60N 2/0705 248/430 |
| 5,176,353 | A * | 1/1993 | Aihara | B60N 2/067 248/419 |
| 5,222,814 | A * | 6/1993 | Boelryk | F16C 29/04 248/430 |
| 6,260,813 | B1 * | 7/2001 | Whitcomb | B64D 11/0696 244/118.6 |
| 6,322,036 | B1 * | 11/2001 | Tame | B60N 2/0705 248/429 |
| 6,742,753 | B2 * | 6/2004 | Klahold | B60N 2/0705 248/429 |
| 7,165,753 | B2 * | 1/2007 | Oh | B60N 2/0715 248/429 |
| 8,371,781 | B2 * | 2/2013 | Roy | B64D 11/0696 410/104 |
| 2003/0164434 | A1 * | 9/2003 | Frohnhaus | B60N 2/0705 248/430 |
| 2004/0222347 | A1 * | 11/2004 | Oh | B60N 2/0705 248/424 |
| 2004/0238712 | A1 | 12/2004 | Oh | |
| 2005/0051694 | A1 * | 3/2005 | Willems | B60N 2/0715 248/429 |
| 2006/0261624 | A1 | 11/2006 | Okuda et al. | |
| 2009/0134671 | A1 * | 5/2009 | Hager | B60J 7/02 296/216.01 |
| 2009/0230275 | A1 * | 9/2009 | Lawall | B60N 2/0224 248/429 |
| 2010/0001546 | A1 * | 1/2010 | Christensen | B64D 11/0696 296/65.13 |
| 2011/0043027 | A1 * | 2/2011 | Hayahara | B60N 2/36 297/452.18 |
| 2011/0233371 | A1 * | 9/2011 | Kitamura | B60N 2/07 248/430 |
| 2013/0214112 | A1 * | 8/2013 | Kawamura | B60N 2/08 248/429 |

FOREIGN PATENT DOCUMENTS

| | | | |
|---|---|---|---|
| DE | 200 19 891 U1 | 6/2001 | |
| DE | 699 15 528 T2 | 3/2005 | |
| DE | 2020050 20 672 U1 | 6/2006 | |
| DE | 1020090 01 318 A1 | 9/2009 | |
| DE | 1020090 38 126 A1 | 2/2011 | |
| DE | 1020090 48 498 A1 | 4/2011 | |
| EP | 0 922 606 A1 | 6/1999 | |
| EP | 1 176 047 A1 | 1/2002 | |
| FR | DE 69915528 T2 * | 3/2005 | ........ B60N 2/01525 |
| FR | 2864481 A1 | 7/2005 | |
| JP | 2004-314956 A | 11/2004 | |
| JP | 2006-321415 A | 11/2006 | |

OTHER PUBLICATIONS

German Office Action received in connection with related German application No. DE 10 2010 063 615.0; dtd Jun. 9, 2011.
International Search Report received in connection with international application No. PCT/EP2011/064490; dtd Nov. 25, 2011.
Office Action dated Oct. 10, 2014 in corresponding Chinese Application No. 201180040654.1, 7 pages.
Office Action dated Nov. 3, 2015 ,in corresponding German application No. 10 2010 063 615.0, (6 pages) and English translation (3 pages).

* cited by examiner

LONGITUDINAL ADJUSTING DEVICE FOR A VEHICLE SEAT, COMPRISING A SEPARABLE UPPER AND LOWER RAIL

CROSS REFERENCE TO RELATED APPLICATIONS

The present application is a National Stage of International Application No. PCT/EP2011/064490 filed on Aug. 23, 2011, which claims the benefit of German Patent Application No. 10 2010 035 157.1 filed on Aug. 23, 2010 and German Patent Application No. 10 2010 063 615.0 filed on Dec. 21, 2010, the entire disclosures of which are incorporated herein by reference.

Description

The invention relates to a longitudinal adjusting device for a vehicle seat comprising a separable upper and lower rail as claimed in the preamble of claim 1.

Conventional longitudinal adjusting devices for vehicle seats which comprise an upper and lower rail form part of the prior art. The upper rail is arranged in the lower rail or engages therein, wherein the upper rail is shaped so as to correspond to the lower rail. It is not provided that the upper rail is able to be separated from the lower rail.

Longitudinal adjusting devices which are able to be separated are disclosed, for example, in DE 10 2009 038 126 A1, DE 10 2009 048 498 A1 or EP 0 922 606 A1.

In the prior art, displaceable and removable or displaceable and tiltable vehicle seats comprise a rail unit consisting of a lower rail and an upper rail and a separate separating device. Said separating device forms a separating point between the rail unit and the vehicle seat which is separate from the rail unit.

It is the object of the present invention to specify a longitudinal adjusting device for a vehicle seat comprising a separable upper and lower rail, said longitudinal adjusting device being improved and, in particular, being able to be used in a more flexible manner and being simpler relative to the prior art.

The object is achieved with regard to the longitudinal adjusting device by the features set forth in claim 1.

Advantageous developments of the invention form the subject-matter of the sub-claims.

In the longitudinal adjusting device for a vehicle seat which comprises a lower rail and an upper rail, wherein the upper rail is longitudinally displaceably arranged in the lower rail, according to the invention the upper rail is in engagement with the lower rail, wherein a retaining and guiding element is configured, integrally formed or arranged on an upper edge of the lower rail, said retaining and guiding element retaining the upper rail in the operating position on the lower rail and wherein at least two locking elements are arranged and/or are integrated in the upper rail, and after the unlocking thereof the upper rail and a vehicle seat fastened thereto in a predetermined position are able to be separated from the lower rail. Thus a vehicle seat may be removed from the vehicle in a simple manner.

In comparison with the prior art, a separate separating device between the rail unit and the vehicle seat is avoided, said separating device being more expensive and heavier and requiring more constructional space.

In a particularly advantageous manner, a simple and cost-effective design for the lower rail is permitted by means of the invention. As a result, a longitudinal adjusting device with a particularly large adjustment path may be integrated directly on or in a vehicle body.

Advantageously, retaining forces acting between the upper rail and the lower rail may be transmitted in the horizontal longitudinal direction and in the vertical direction by means of a positive connection formed by the locking elements.

In a particularly advantageous manner, retaining forces acting between the upper rail and the lower rail may be transmitted in the vertical direction by means of a positive connection formed by the retaining and guiding element acting on the upper face at least on the locking elements.

In an advantageous embodiment, a plurality of recesses is arranged in the lower rail so that the upper rail is able to be separated from the lower rail in at least one position predetermined by the recesses.

Expediently, a plurality of through-holes is formed in the side portion of the rail profile of the lower rail, said through-holes being arranged adjacent to one another in the longitudinal direction of the lower rail and permitting a particularly finely adjusted blocking of the upper rail relative to the lower rail.

In a further advantageous embodiment, a lower region of the upper rail arranged in the lower rail is shaped so as to correspond to a receiving rail profile in the lower rail. As a result, a movement of the upper rail relative to the lower rail is permitted with minimum clearance or without clearance.

Expediently, in each case a locking element is arranged in a front end region and in a rear end region of the upper rail.

In a further advantageous embodiment, a retaining and guiding element is configured, integrally formed or arranged on an upper edge of the lower rail, said retaining and guiding element retaining the upper rail in the operating position on the lower rail.

In each retaining and guiding element, two recesses are preferably arranged at a distance from one another, which corresponds to a distance between the locking elements in the upper rail. Thus, the position in which the upper rail may be lifted away from the lower rail is predetermined by means of the recesses.

Particularly preferably, a locking pin is displaceably arranged in the locking element, transversely to the alignment of the lower rail and the upper rail, wherein a cross section of the locking pin is shaped so as to correspond to through-holes which are arranged in side portions of the rail profile. As a result, the lower rail and the upper rail may be blocked relative to one another, so that a movement is prevented between the lower rail and upper rail.

Preferably, at least two roller elements are rotatably arranged or integrated on the upper rail, such that said roller elements protrude at least partially on the lower face of the upper rail, so that in the operating position of the upper rail the roller elements roll in the rail profile of the lower rail. As a result, a movement of the upper rail 3 relative to the lower rail 2 is permitted with particularly minimal friction and reduced force.

In an alternative embodiment, at least one further locking unit is arranged in the upper rail, said locking unit engaging below an upper edge of the rail profile in the locked position and preventing the upper rail from lifting away from the lower rail, and in the unlocked position enabling the upper rail to lift away from the lower rail. Thus, the upper rail may be separated from the lower rail in any position.

The lower rail expediently comprises at least the rail profile and two flange regions arranged laterally therefrom, wherein the flange regions cover the through-holes in the side portion of the rail profile and thus minimize the risk of injury to the vehicle occupants.

The two retaining and guiding elements are preferably aligned so as to face one another and protrude over the side portion of the rail profile of the lower rail. Thus the locking elements in the operating position of the upper rail are positively retained by the retaining and guiding elements and the upper rail is secured against being vertically lifted away from the lower rail.

In a particularly preferred manner, the flange region is chamfered on its upper edge and in this manner forms the retaining and guiding elements. As a result, it is possible to produce the lower rail in a particularly simple and efficient manner, said lower rail preferably consisting of two stamped metal parts connected together.

The invention is described in more detail with reference to the accompanying schematic figures, in which.

Parts which correspond to one another are provided with the same reference numerals in all the figures.

Figure 1:
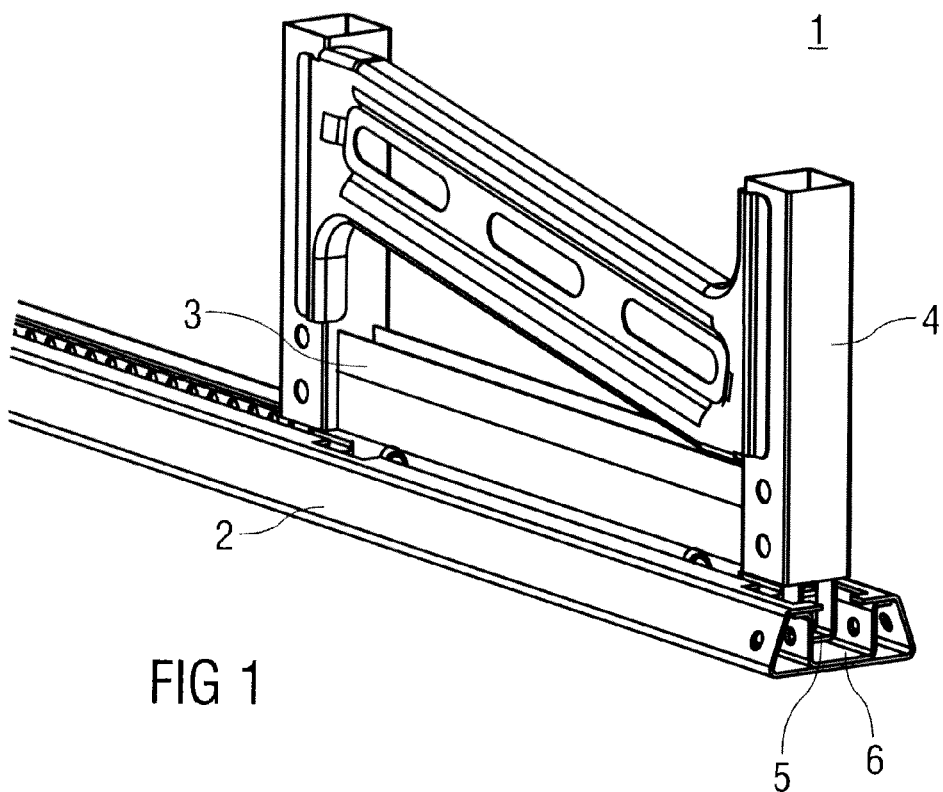
FIG. 1 shows schematically a perspective view of a rail unit.

In FIG. 1 a perspective view of a rail unit 1 is shown schematically. Such a rail unit 1 comprises a lower rail 2 and an upper rail 3.

The lower rail 2 is fastened in the conventional manner, not shown, to a vehicle floor of a vehicle and preferably aligned in the longitudinal direction of the vehicle.

A conventional vehicle seat is arranged on the upper rail 3, a frame element 4 thereof being shown. The vehicle seat is, therefore, displaceable in the vehicle by a longitudinal displacement of the upper rail 3 relative to the lower rail 2.

In the operating position shown in FIG. 1 of the rail unit 1, the upper rail 3 is longitudinally displaceably arranged at least partially in the lower rail 2.

A lower region 5 of the upper rail 3 arranged in the lower rail 2 is shaped so as to correspond to the receiving rail profile 6 in the lower rail 2.

Figure 2:
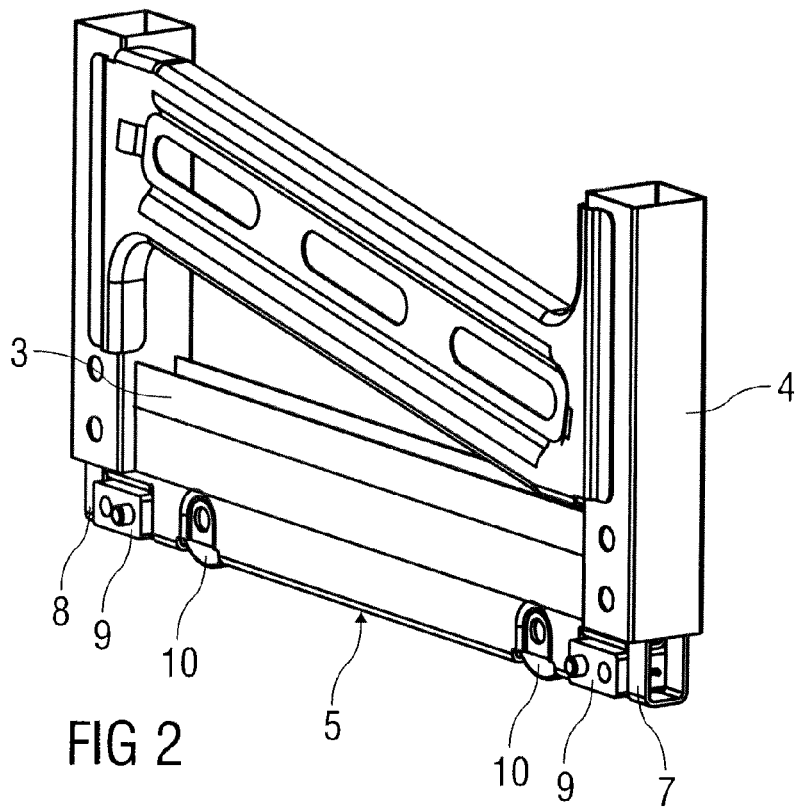
FIG. 2 shows schematically a perspective view of an upper rail.

In FIG. 2 a perspective view of the upper rail 3 is shown schematically with the frame element 4 arranged thereon.

A locking element 9 is arranged in each case in a front end region 7 and in a rear end region 8 of the upper rail 3.

The locking elements 9 are arranged in the lower region 5 of the upper rail 3 and in the operating position of the rail unit 1 are arranged in the rail profile 6 of the lower rail 2 on the inside.

In the lower region 5 of the upper rail 3 at least two conventional roller elements 10 are rotatably arranged between the locking elements 9. Said roller elements 10 roll in the rail profile 6 of the lower rail 2 and, as a result, permit a movement of the upper rail 3 relative to the lower rail 2 with minimal friction and reduced force.

In an alternative embodiment, not shown, conventional sliding elements made of a reduced-friction plastics material, for example, may be arranged instead of the roller elements 10.

In a further alternative embodiment, not shown, the roller elements 10 are able to roll on a flange region 11 of the lower rail 2.

Figure 3:
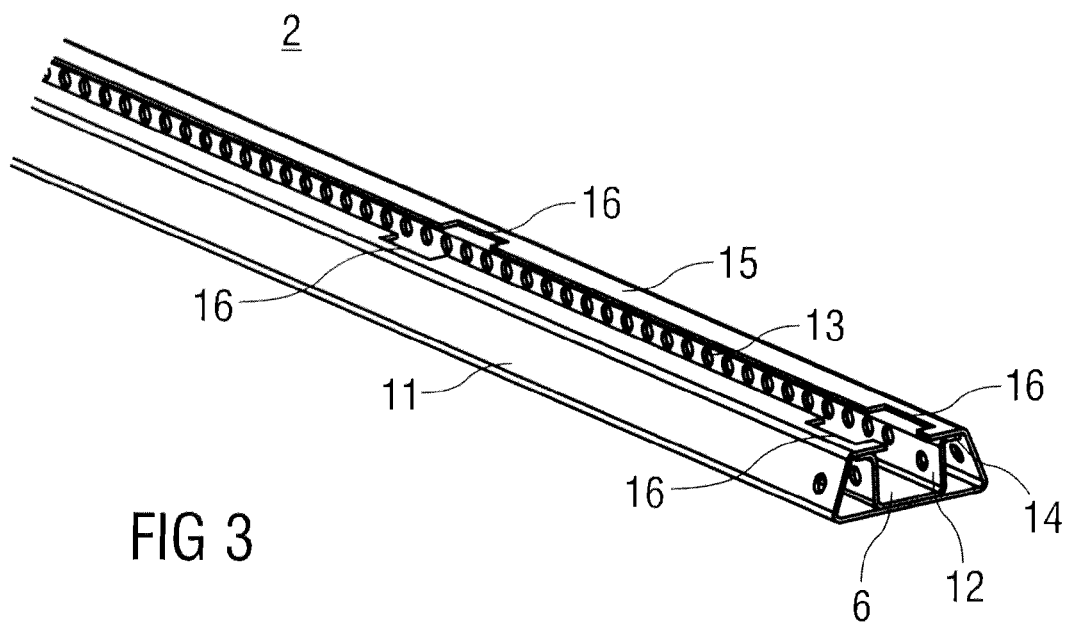
FIG. 3 shows schematically a perspective view of a lower rail.

In FIG. 3, a perspective view of the lower rail 2 is shown schematically.

The lower rail 2 comprises at least the rail profile 6 and two flange regions 11 arranged laterally therefrom.

The rail profile 6 is of substantially U-shaped configuration and has in its side portions 12 a plurality of through-holes 13 arranged adjacent to one another in the longitudinal direction of the rail profile 6.

A retaining and guiding element 15 is arranged on an upper edge 14 of each side portion 12 of the rail profile 6.

The two retaining and guiding elements 15 are aligned so as to face one another and protrude over the side portion 12.

In particular, a flange region 11 may be chamfered on the upper edge 14 and form the retaining and guiding element 15.

In a variant, not shown, the retaining and guiding element 15 may be configured as a separate component and may be arranged on the upper edge 14.

In each retaining and guiding element 15, two recesses 16 are arranged at a distance from one another which corresponds to a distance between the locking elements 9 in the upper rail 3.

The recesses 16 of the two adjacent retaining and guiding elements 15 are arranged so as to oppose one another.

The recesses 16 are formed such that they do not protrude over the side portion 12. For example, the side portion 12 and the recesses 16 terminate flush with one another.

Figure 4:
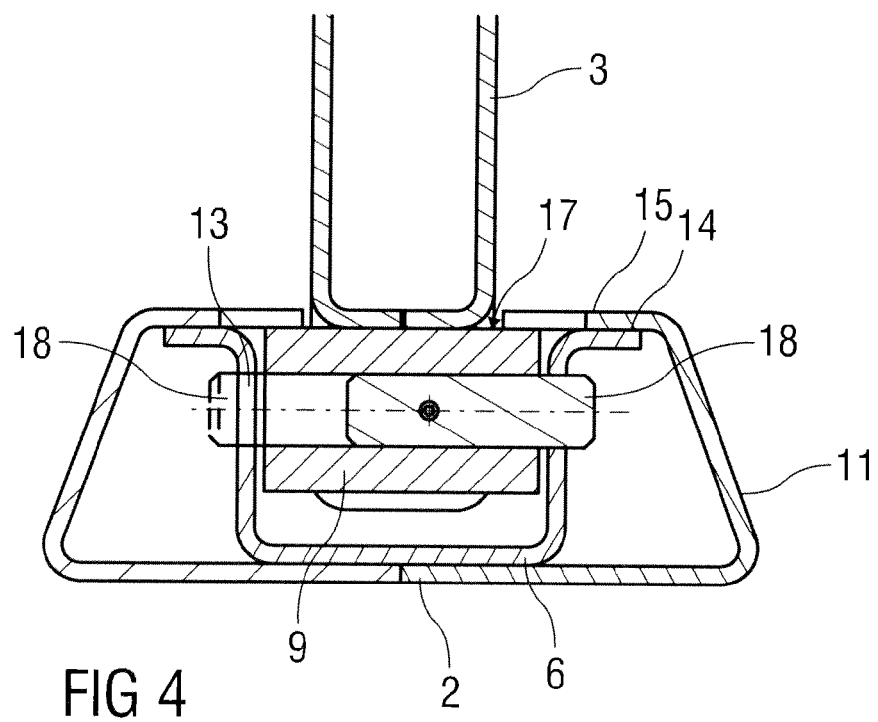
FIG. 4 shows schematically a sectional view of a locking element in the operating position and FIG. 5 shows schematically a sectional view of a locking element in the removal position.

In FIG. 4, a sectional view of the locking element 9 is shown schematically in the operating position.

A position is denoted as the operating position in which the upper rail 3 is displaceably arranged in the lower rail 2, wherein the locking elements 9 are not located in the region of the recesses 16.

As a result, the locking elements 9 are retained on the upper face 17 thereof by the retaining and guiding element 15 and the upper rail 3 is secured positively against separation from the lower rail. In this case, retaining forces acting between the upper rail 3 and the lower rail 2 may be transmitted in the vertical direction by means of this positive connection.

A width of the locking element 9 is shaped so as to correspond to an internal width of the rail profile 6.

A locking pin 18 is displaceably arranged in the locking element 9 in the transverse vehicle direction, thus transversely to the alignment of the rail unit 1.

A cross section of the locking pin 18 is shaped so as to correspond to the through-holes 13 in the side portions 12 of the rail profile 6.

During the operation of the locking element 9, the locking pin 18 is arranged fully in the locking element 9 in a first position. In this position, the upper rail 3 is displaceable in the lower rail 2.

In a second position, the locking pin 18 is displaced in the transverse vehicle direction such that it protrudes from the locking element 9 and is arranged in one of the through-holes 13 in the side portion 12 of the rail profile 6. In this position, the upper rail 3 is blocked in the lower rail 2, so that any relative movement is avoided between the upper rail 3 and the lower rail 2. As a result, the vehicle seat arranged on the upper rail 3 is not displaceable and its position is secured against being altered.

Figure 5:
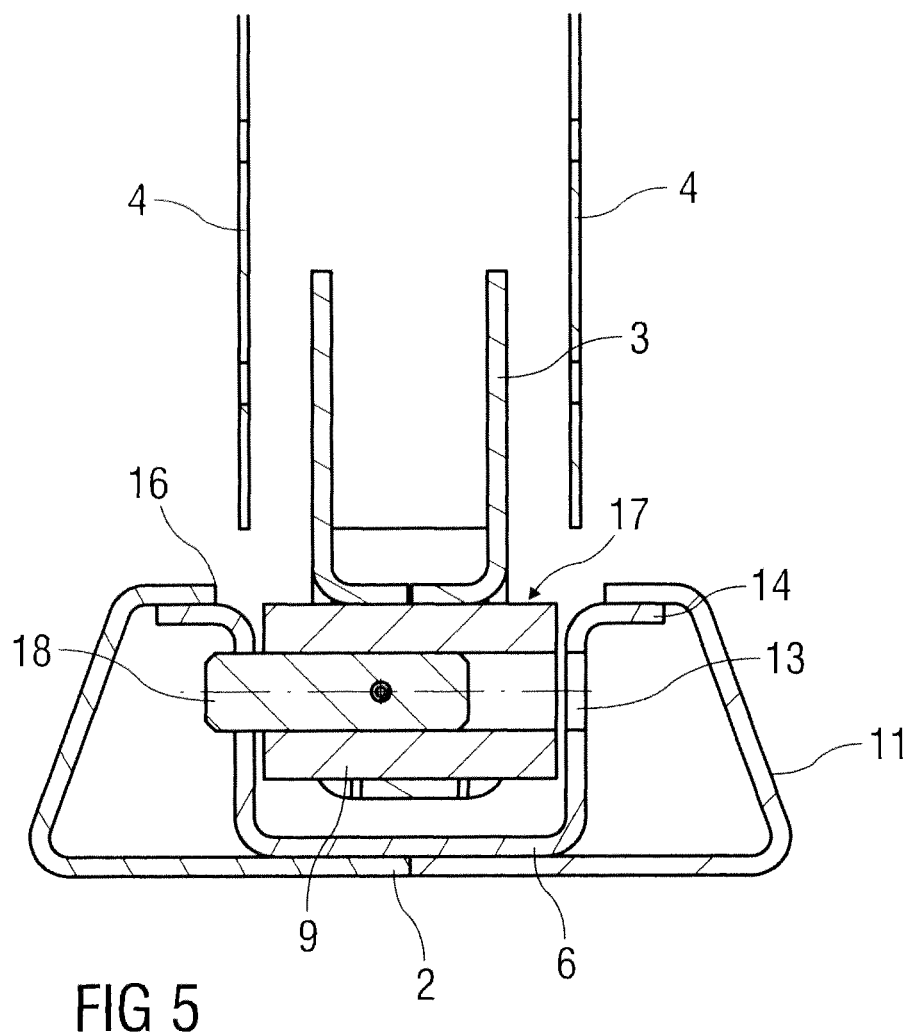

In FIG. 5, a sectional view of the locking element 9 is shown schematically in the removal position.

The position in which the locking elements 9 are located in the region of the recesses 16 is denoted as the removal position.

In this position, the locking elements 9 are not retained on the upper face 17 thereof by the retaining and guiding element 15. As a result, after releasing the locking pin 18, the upper rail 3 with the vehicle seat arranged thereon may be removed upwardly out of the lower rail 2 and thus out of the vehicle.

In an alternative embodiment, not shown, the retaining and guiding element 15 is dispensed with on the upper edge 14 of the rail profile 6. At least one further locking unit is arranged in the upper rail 3, said locking unit engaging below the upper edge 14 of the rail profile 6 in the locked position, and thus preventing the upper rail 3 from lifting away from the lower rail 2. The lifting of the upper rail 3 away from the lower rail 2 is permitted in the unlocked position of the further locking unit. By means of the further locking unit in the upper rail 3, a separation of the upper rail 3 and the lower rail 2 is permitted at any point within the movement range of the rail unit 1.

LIST OF REFERENCE NUMERALS

1 Rail unit
2 Lower rail
3 Upper rail
4 Frame element
5 Lower region
6 Rail profile
7 Front end region
8 Rear end region
9 Locking element
10 Roller elements
11 Flange region
12 Side portion
13 Through-hole
14 Upper edge
15 Retaining and guiding element
16 Recess
17 Upper face
18 Locking pin

The invention claimed is:

1. A longitudinal adjusting device for a vehicle seat, said longitudinal adjusting device comprising:
    a lower rail;
    an upper rail configured to fasten to the vehicle seat in a predetermined position,
    wherein the upper rail is displaceably arranged in the lower rail,
    wherein the upper rail is in engagement with the lower rail;
    at least two locking elements arranged and/or integrated in the upper rail and movable between an operating position and a removal position;
    a retaining and guiding element that is configured, integrally formed or arranged on an upper edge of the lower rail, said retaining and guiding element retaining the upper rail on the lower rail when the at least two locking elements are in the operating position during a longitudinal displacement of the upper rail relative to the lower rail; and
    locking pins, each of the locking pins being displaceably arranged in a respective one of the at least two locking elements such that at least a portion of each of the locking pins can be displaced within the respective one of the at least two locking elements between a locked position and an unlocked position, wherein the locking pins are prevented to engage the lower rail in the unlocked position,
    wherein the lower rail, the upper rail, and the at least two locking elements are configured such that the upper rail is able to be separated and upwardly removed from the lower rail when the at least two locking elements are in the removal position and each of the locking pins are in the unlocked position, wherein the at least two locking elements remain arranged and/or integrated in the upper rail,
    wherein a plurality of recesses is arranged in the lower rail,
    wherein, during the longitudinal displacement of the upper rail relative to the lower rail, the upper rail is moved to align each of the at least two locking elements with a respective one of the plurality of recesses in the removal position in order to allow the upper rail to be separated from the lower rail.

2. The longitudinal adjusting device as claimed in claim 1, wherein the adjusting device is configured such that retaining forces acting between the upper rail and the lower rail are configured to be transmitted in a horizontal longitudinal direction and in a vertical direction by a positive connection formed by each of the locking pins.

3. The longitudinal adjusting device as claimed in claim 1, wherein the adjusting device is configured such that retaining forces acting between the upper rail and the lower rail are configured to be transmitted in a vertical direction by a positive connection formed by the retaining and guiding element acting on an upper face at least on the at least two locking elements.

4. The longitudinal adjusting device as claimed in claim 1, wherein each of the at least two locking elements are movable through the respective one of the plurality of recesses so that the upper rail is able to be separated from the lower rail in at least one position predetermined by the recesses.

5. The longitudinal adjusting device as claimed in claim 4 wherein each of the locking pins is displaceably arranged in the respective one of the at least two locking elements, transversely to the alignment of the lower rail and the upper rail, wherein a cross section of each of the locking pins is formed so as to correspond to through-holes which are arranged in side portions of a rail profile.

6. The longitudinal adjusting device as claimed in claim 4, wherein the upper rail, which is configured to be fastened to the vehicle seat, is separable and upwardly removable from the lower rail when the at least two locking elements are in the removal position by moving the at least two locking elements upwardly in a vertical direction out of the plurality of recesses and out of the lower rail while the at least two locking elements are each longitudinally aligned with the respective one of the plurality of recesses, wherein the vertical direction is substantially perpendicular to a horizontal longitudinal direction.

7. The longitudinal adjusting device as claimed in claim 1, wherein a plurality of through-holes is formed in a side portion of a rail profile of the lower rail, said through-holes being arranged adjacent to one another in a longitudinal direction of the lower rail.

8. The longitudinal adjusting device as claimed in claim 1, wherein a lower region of the upper rail arranged in the lower rail is shaped so as to correspond to a receiving rail profile in the lower rail.

9. The longitudinal adjusting device as claimed in claim 1, wherein at least one of the at least two locking elements is arranged in a front end region and at least another of the at least two locking elements is arranged in a rear end region of the upper rail.

10. The longitudinal adjusting device as claimed in claim 9, wherein the plurality of recesses includes two recesses, wherein the two recesses are arranged at a distance from one another which corresponds to a distance between the at least two locking elements in the upper rail.

11. The longitudinal adjusting device as claimed in claim 1, wherein at least two roller elements are rotatably arranged or integrated on the upper rail, such that said roller elements protrude at least partially on a lower face of the upper rail.

12. The longitudinal adjusting device as claimed in claim 11, wherein, in the operating position of the at least two locking elements, the roller elements are configured to roll in a rail profile of the lower rail.

13. The longitudinal adjusting device as claimed in claim 1, wherein the at least two locking elements are arranged in the upper rail, wherein, in the operating position, the at least two locking elements engage below the upper edge of a rail profile of the lower rail and prevent the upper rail from lifting away from the lower rail, and wherein, in the removal position, the at least two locking elements enable the upper rail to lift away from the lower rail.

14. The longitudinal adjusting device as claimed in claim 1, wherein the lower rail comprises at least a rail profile and two flange regions arranged laterally therefrom.

15. The longitudinal adjusting device as claimed in claim 14, wherein the flange region is chamfered on the upper edge and forms the retaining and guiding element.

16. The longitudinal adjusting device as claimed in claim 1, wherein the retaining and guiding element comprises two portions that are aligned so as to face one another and protrude over a side portion of a rail profile of the lower rail.

17. The longitudinal adjusting device as claimed in claim 1, wherein the locking pins are movable relative to the upper rail and the lower rail between the locked position and the unlocked position.

18. A longitudinal adjusting device for a vehicle seat, said longitudinal adjusting device comprising:
   a lower rail;
   an upper rail configured to fasten to the vehicle seat in a predetermined position,
   wherein the upper rail is displaceably arranged in the lower rail,
   wherein the upper rail is in engagement with the lower rail;
   at least two locking elements arranged and/or integrated in the upper rail and movable between an operating position and a removal position;
   a retaining and guiding element that is configured, integrally formed or arranged on an upper edge of the lower rail, said retaining and guiding element retaining the upper rail on the lower rail when the at least two locking elements are in the operating position during longitudinal displacement of the upper rail relative to the lower rail; and
   locking pins, each of the locking pins being displaceably arranged in a respective one of the at least two locking elements such that at least a portion of each of the locking pins can be displaced within the respective one of the at least two locking elements between a locked position and an unlocked position, wherein the locking pins are prevented to engage the lower rail in the unlocked position,
   wherein the lower rail, the upper rail, and the at least two locking elements are configured such that a longitudinal displacement between the upper rail and the lower rail is prevented when the locking pins are in the locked position,
   wherein the lower rail, the upper rail, and the at least two locking elements are configured such that the upper rail is able to be separated and upwardly removed from the lower rail when the at least two locking elements are in the removal position and each of the locking pins are in the unlocked position, wherein the at least two locking elements remain arranged and/or integrated in the upper rail,
   wherein a plurality of recesses is arranged in the lower rail,
   wherein, during the longitudinal displacement of the upper rail relative to the lower rail, the upper rail is moved to align each of the at least two locking elements with a respective one of the plurality of recesses in the removal position in order to allow the upper rail to be separated from the lower rail.

* * * * *